US006900401B1

(12) United States Patent
Sparre

(10) Patent No.: US 6,900,401 B1
(45) Date of Patent: May 31, 2005

(54) TOXIC GAS FITTING INTERLOCK

(75) Inventor: Brent S. Sparre, Carmichael, CA (US)

(73) Assignee: NEC Electronics America, Inc., Santa Clara, CA (US)

( * ) Notice: Subject to any disclaimer, the term of this patent is extended or adjusted under 35 U.S.C. 154(b) by 218 days.

(21) Appl. No.: 10/014,641

(22) Filed: Dec. 10, 2001

Related U.S. Application Data

(60) Provisional application No. 60/325,604, filed on Sep. 28, 2001.

(51) Int. Cl.[7] .................... H01M 9/06
(52) U.S. Cl. .................... 200/61.86; 200/81 R
(58) Field of Search .................... 200/61.86, 61.85, 200/61.6, 50.1–50.4, 81 R–81 H

(56) References Cited

U.S. PATENT DOCUMENTS 4,140,436 A * 2/1979 Schumacher et al. .......... 417/27
4,427,853 A * 1/1984 Layciak et al. .......... 200/50.36
4,469,122 A * 9/1984 Meek .......... 137/312
4,701,578 A * 10/1987 Keranen et al. .......... 200/5 B
4,723,058 A * 2/1988 Mitsukuchi et al. .......... 218/84
4,839,533 A * 6/1989 Aga .......... 307/140
5,408,058 A * 4/1995 Homik et al. .......... 200/50.01
5,739,494 A * 4/1998 Frost .......... 200/61.86
5,949,039 A * 9/1999 Koek et al. .......... 200/50.1
6,006,773 A * 12/1999 Bravo .......... 137/15.08
6,500,263 B2 * 12/2002 Chang et al. .......... 118/715

* cited by examiner

*Primary Examiner*—K. Lee
(74) *Attorney, Agent, or Firm*—Campbell Stephenson Ascolese, LLP

(57) ABSTRACT

A method and apparatus relating to the safe handling of toxic gases are presented, including a gas fitting interlock apparatus comprising a pedestal portion; a fitting support portion disposed on the pedestal portion; an interlock nut clamp configured to be fastened to the fitting support portion; and a fastener for fastening the interlock nut clamp to the fitting support portion, the fastener being capable of being tightened to a tightness equal to or greater than a predetermined tightness sufficient to clamp a gas line disposed between the interlock nut clamp and the pedestal portion.

11 Claims, 4 Drawing Sheets

TOXIC GAS FITTING INTERLOCK

CROSS-REFERENCE TO RELATED APPLICATION

This application claims priority from Provisional Patent Application No. 60/325,604, filed Sep. 28, 2001, entitled "Toxic Gas Fitting Interlock," and having Brent S. Sparre as the inventor. Provisional Patent Application No. 60/325,604 is hereby incorporated by reference, in its entirety and for all purposes.

BACKGROUND OF THE INVENTION

1. Field of the Invention

This invention relates to the field of handling gases. More specifically, this invention relates to the safe handling of toxic gases when the connection of lines carrying such gases must be verified before equipment can be operated.

2. Description of the Related Art

A variety of equipment requires the use of toxic gases in its operation, e.g., Watkins Johnson/Semi-Valley Group ("WJ/SVG") Semiconductor Division atmosphere chemical vapor disposition ("APCVD") process equipment, which deposits a layer of glass on the product in the semiconductor component manufacturing process. These toxic gases are generally carried through lines to and/or from the equipment. Further, such lines must generally be connected and/or disconnected at fittings, e.g., for maintenance or for reconfiguration of the equipment.

The need for such connections and/or disconnections of toxic gas lines creates or enhances risks and costs for operators of such equipment and those near the equipment. Connection and/or disconnection of toxic gas fitting for, e.g., maintenance and reconfiguration, can lead to the accidental or otherwise inadvertent disconnection of a toxic gas fitting for a line that is later used to carry toxic gas, leading to the toxic gas being introduced to the environment. Thus, such inadvertent disconnection of toxic gas fittings can lead to the endangerment of personnel near and around the equipment, and to evacuations of buildings and even areas near the equipment, leading to, among other things, damage to the health of personnel and loss of productivity and profit.

Generally, proper gas fitting configurations in such equipment are verified by two-person verification of proper connections (the "buddy system"). Further, generally, there is no apparatus that would check connections and/or disconnections, specifically to stop toxic gas flow if a line or lines carrying toxic gas are disconnected.

What is needed is a method and system for monitoring and verifying gas fitting connections, including toxic gas fitting connections, before operation of equipment involving the flow of gas through lines that are supposed to be connected to those fittings. Such a method and apparatus should not rely solely on human inspection of the fittings, and should reduce the risk of exposure of personnel to toxic gas, while preventing losses in productivity and profit through, e.g., evacuations necessitated by release of toxic gases through lines not connected to the equipment.

SUMMARY OF THE INVENTION

A method and system are presented for using gas fitting connections, including toxic gas fitting connections, before operation is permitted of equipment involving the flow of gas through lines that are supposed to be connected to those fittings. One embodiment of the invention uses an interlock that is operably connected into gas-handling equipment's input/output ("I/O") circuitry such that the interlock must be closed and fitted around a Vascular Connector Oring/Vascular Connector Retaining Ring (VCO/VCR™) nut before the equipment will operate.

Such a method and apparatus does not rely solely on human inspection of the fittings, and reduces the risk of exposure of personnel to toxic gas, while preventing possible damage to personnel health and losses in productivity and profit through, e.g., evacuations necessitated by release of toxic gases through lines not connected to the equipment. The system and method include in at least one embodiment a pressure sensitive toxic gas VCO/VCR™ fitting that would fit between the male/female fittings and that would not have to be removed from the nut fittings each time there is periodic maintenance on the equipment. In at least one embodiment, the interlock is calibrated so that there is a specific amount of torque put on the gas fittings before the interlock would activate.

A gas fitting interlock apparatus is presented, comprising a pedestal portion; a fitting support portion disposed on the pedestal portion; an interlock nut clamp configured to be fastened to the fitting support portion; and a fastener for fastening the interlock nut clamp to the fitting support portion, the fastener being capable of being tightened to a tightness equal to or greater than a predetermined tightness sufficient to clamp a gas line disposed between the interlock nut clamp and the pedestal portion.

At least one embodiment is this apparatus further comprises a momentary switch disposed within the pedestal portion, wherein the momentary switch is closed when the fastener is tightened to a tightness equal to or greater than the predetermined tightness sufficient to clamp the gas line disposed between the interlock nut clamp and the pedestal portion and open when the fastener is not tightened to a tightness equal to or greater than the predetermined tightness sufficient to clamp the gas line disposed between the fitting support portion and the pedestal portion.

An apparatus for atmosphere chemical vapor deposition is presented, the apparatus comprising a gas fitting interlock apparatus including a pedestal portion; a fitting support portion disposed on the pedestal portion; an interlock nut clamp configured to be fastened to the fitting support portion; and a fastener for fastening the interlock nut clamp to the fitting support portion, the fastener being capable of being tightened to a tightness equal to or greater than a predetermined tightness sufficient to clamp a gas line disposed between the interlock nut clamp and the pedestal portion. In at least one embodiment, this apparatus further comprises a momentary switch disposed within the pedestal portion, wherein the momentary switch is closed when the fastener is tightened to a tightness equal to or greater than the predetermined tightness sufficient to clamp the gas line disposed between the interlock nut clamp and the pedestal portion and open when the fastener is not tightened to a tightness equal to or greater than the predetermined tightness sufficient to clamp the gas line disposed between the fitting support portion and the pedestal portion.

A method for using a gas fitting connection is presented, the method comprising inserting a gas line into an interlock component for receiving the gas line, the interlock component including a momentary switch; tightening the interlock component to a tightness equal to or greater than a predetermined tightness sufficient to clamp the gas line, the tightness to which the interlock component is tightened enabling the momentary switch to close; presenting an indication when the momentary switch is closed; and preventing gas from flowing through the gas line when the momentary switch is open.

An apparatus is presented, comprising means for receiving a gas line into an interlock component, the interlock component including a momentary switch; means for tightening the interlock component to a tightness equal to or greater than a predetermined tightness sufficient to clamp the gas line, the tightness to which the interlock component is tightened enabling the momentary switch to close; means for presenting an indication when the momentary switch is closed; and means for preventing gas from flowing through the gas line when the momentary switch is open.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1A:
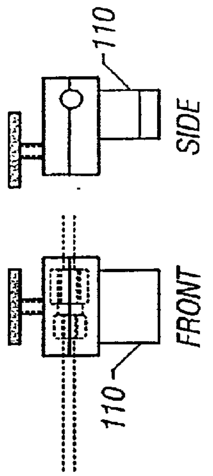
FIG. 1A depicts an interlock component of an embodiment of the invention.

FIG. 1A depicts an interlock component of an embodiment of the present invention. Front and side views of interlock component 110 are shown.

Figure 1B:
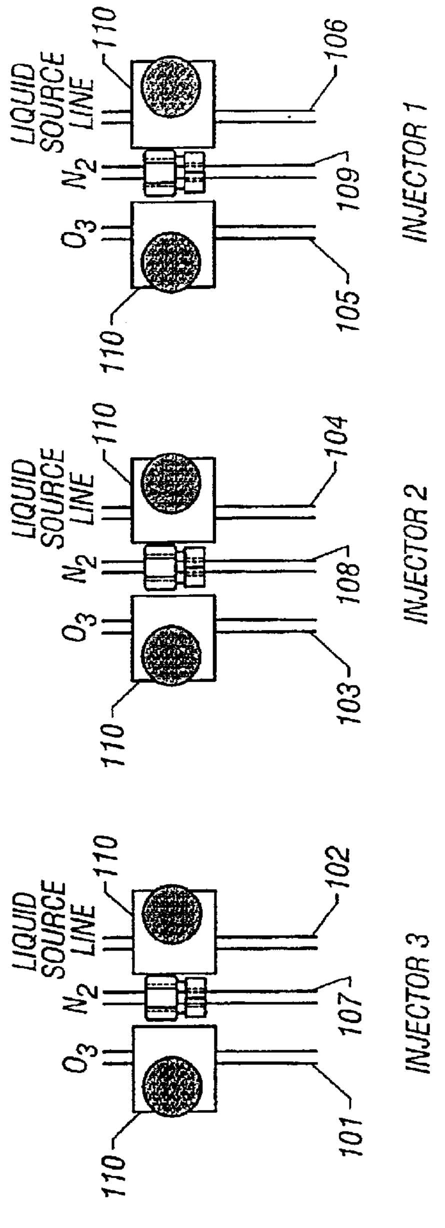
FIG. 1B depicts the interlock component depicted in FIG. 1A with gas lines connected.

FIG. 1B depicts interlock component 110 along with an exemplary arrangement of interlock components 110 in conjunction with toxic gas lines 101, 102, 103, 104, 105, and 106. Lines 102, 104, and 106 carry fluid that is in the gaseous state at interlock component 110. Also shown are non-toxic gas lines 107, 108, and 109, which do not make use of interlock component 110. The interlock components 110 and the gas lines 101–109 are configured in the example shown into three injectors. It will be appreciated by one skilled in the art that the numbers, combinations, and configurations of gas lines and injectors depicted in FIG. 1 are exemplary and are not intended to be limiting in any way.

In the embodiment illustrated in FIGS. 1A and 1B, to operate the interlock component, an operator loosens the knob until the interlock lid opens. The knob does not need to be removed completely. The operator then encloses the gas line fitting inside the interlock and closes the lid. Preferably, the operator uses both hands, one to keep the lid shut tightly and the other to tighten the knob of the interlock. Once the operator tightens the knob sufficiently, the interlock is made and the corresponding indicator, e.g., a light-emitting diode ("LED"), indicating that the interlock is made should be lit.

In the embodiment illustrated in FIGS. 1A and 1B, if there is a problem with the I/O interlock working correctly, e.g., if an LED indicating that the interlock is made does not light when expected, the operator preferably first attempts to correct the problem by troubleshooting the corresponding LED that is not lit with the interlock. If the troubleshooting procedure fails to resolve the problem, the operator preferably disconnects the entire gas line interlock at the I/O door interlock switch. Preferably, the operator disconnects the door switch from the gas line switches using the male/female connector, placing the tool in normal factory operating condition.

In the embodiment illustrated in FIGS. 1A and 1B, the LED circuit does not affect the I/O interlock. The I/O interlock and LED circuits are two separate powered circuits.

Figure 2:
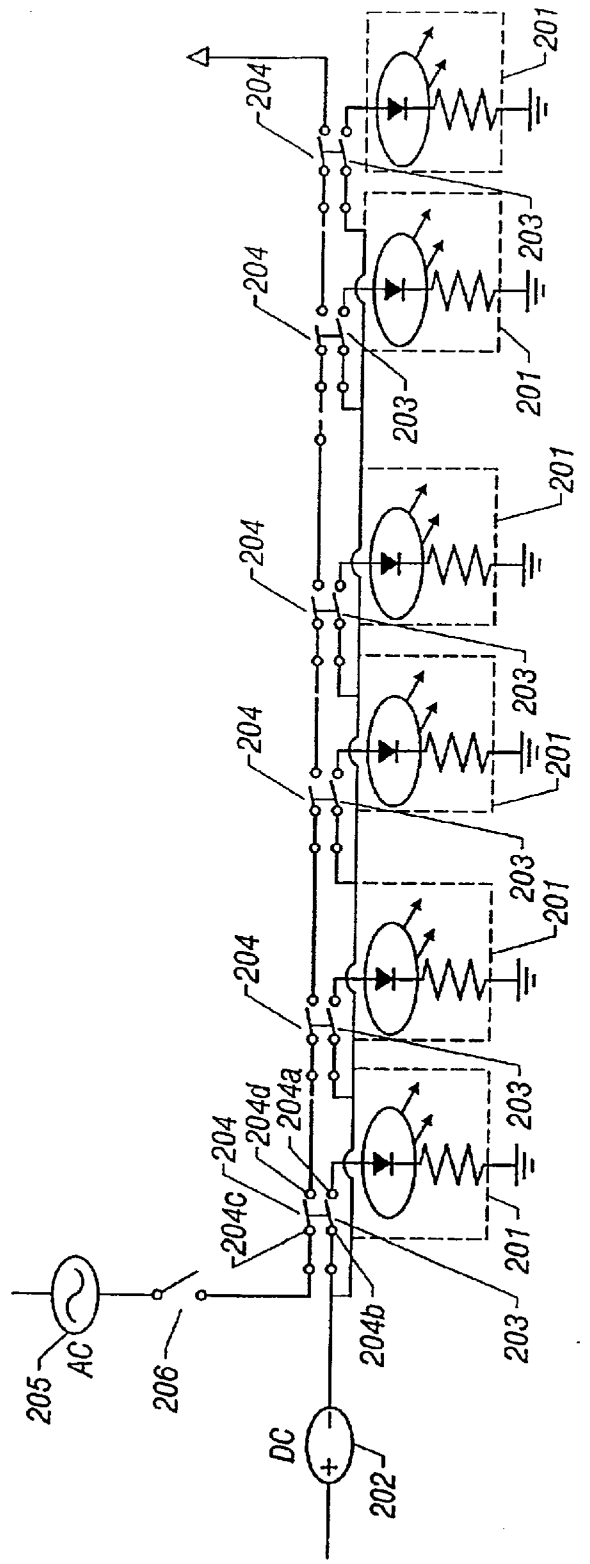
FIG. 2 depicts a circuit diagram of an embodiment of the invention.

FIG. 2 depicts a circuit diagram of an embodiment of the invention. All of the LEDs 201, six LEDs in an embodiment depicted in FIG. 2, are independent of each other, and each will light when the corresponding interlock is made. Depicted are 12 volt DC power source 202 located in the gas power box; LEDs 201 operably connected to 12 volt DC power source 202 via switches 203, such that each LED has a separate switch, and such that the switches are operably connected to corresponding switches 204 in a circuit comprising a 24 volt AC interlock power source 205, and such that when an LED switch 203 is open or closed, the corresponding switch 204 is in the same state (open or closed) as the corresponding LED switch 203. The circuit comprising the 24 volt AC power source 205 is a separate circuit from that circuit comprising the LEDs 201. The circuit comprising the 24 volt AC power source also comprises a switch 206 for the left gas door I/O interlock.

The two circuits depicted in FIG. 2 operate to monitor and verify interlocks on toxic gas lines before the equipment making use of the toxic gas is allowed to operate. The switches 203 and 204 together provide the link between the physical interlock mechanism, the circuit comprising LEDs 201, and the circuit comprising switches 204, which circuit is operably connected to the equipment circuitry (not shown). When a toxic gas interlock is not properly made the corresponding LED 201 provides a visual indication of the absence of the made interlock, and the equipment is prevented from operating by the circuit operably connected to the equipment circuitry.

Figure 3:
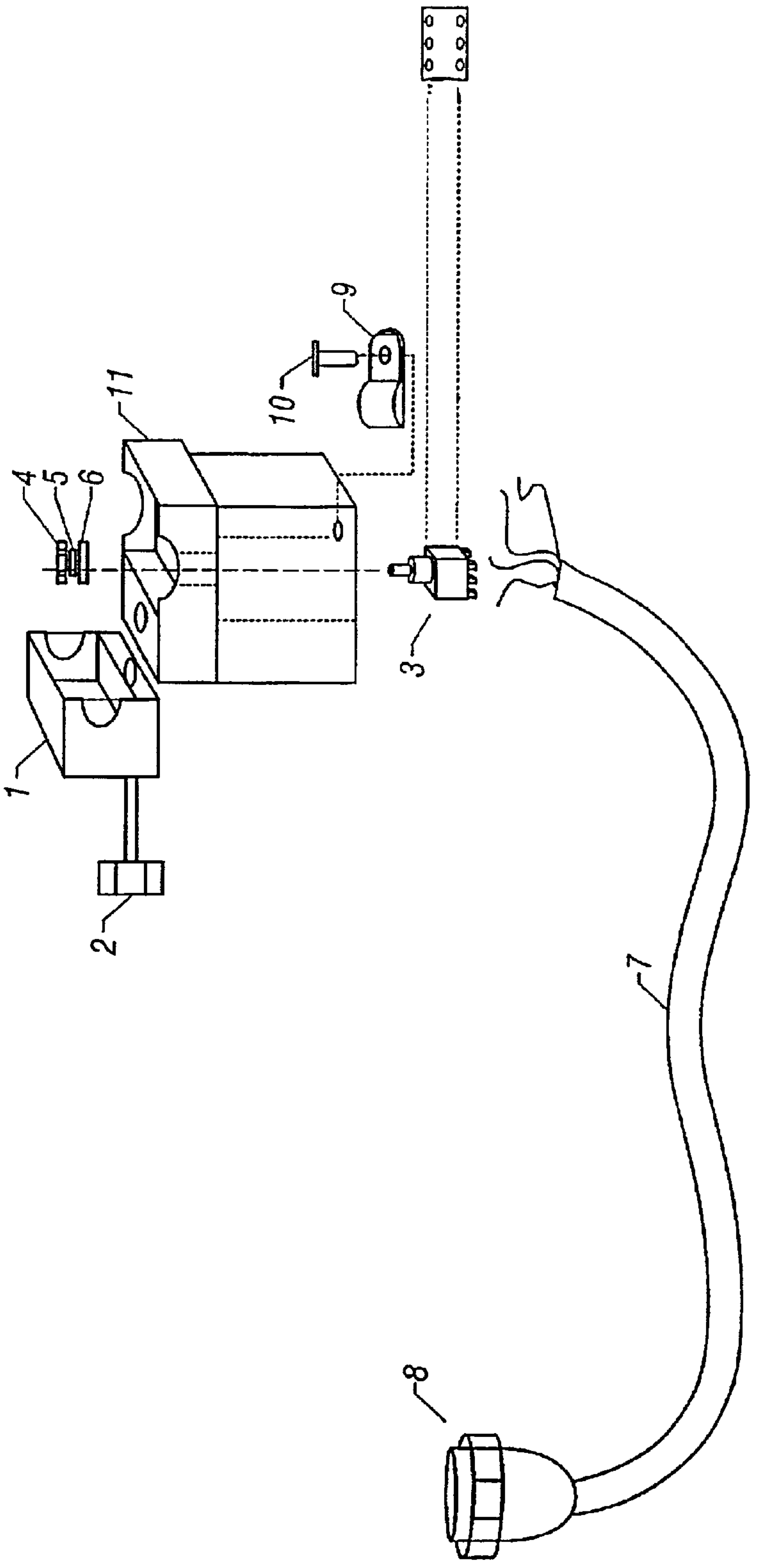
FIG. 3 depicts an exploded diagram of an embodiment of the invention.

In an embodiment depicted in FIG. 3, switches 203 and 204 together are implemented as unitary momentary switches 3, one of which is shown. Also depicted are interlock nut clamp 1; ¼-20 fastener 2; momentary switch nut fastener 4; momentary switch star washer 5; momentary switch washer 6; shielded cable 7; female cannon plug 8; cable fastener 9; 4–40 panhead 10; and interlock component 11. These components are operably connected in the fashion depicted to provide the interlock of the present invention.

Figure 4:
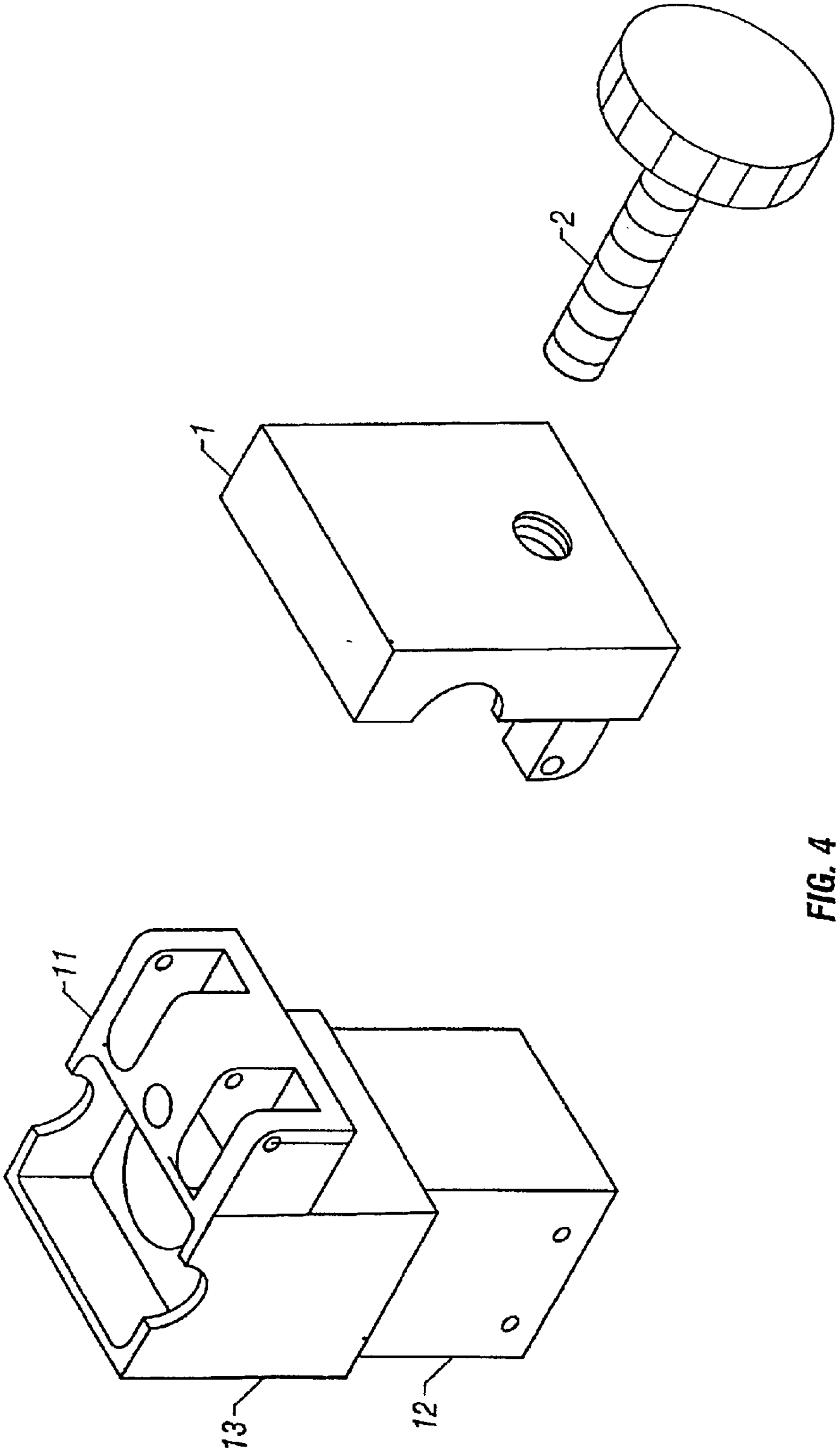
FIG. 4 depicts an isometric view of an interlock nut clamp, a ¼-20 fastener, and an interlock component of an embodiment of the present invention.

FIG. 4 depicts an isometric view of interlock nut clamp 1, ¼-20 fastener 2, interlock component 11, pedestal portion 12, and fitting support portion 13 of an embodiment of the present invention.

While particular embodiments of the present invention have been shown and described, it will be obvious to those skilled in the art that, based upon the teachings herein, changes and modifications may be made without departing from this invention and its broader aspects and therefore the appended claims are to encompass within their scope all such changes and modifications as are within the true spirit and scope of this invention.

What is claimed is:

1. A gas fitting interlock apparatus comprising:

a pedestal portion;

a fitting support portion disposed on the pedestal portion;

an interlock nut clamp configured to be fastened to the fitting support portion; and a fastener for fastening the interlock nut clamp to the fitting support portion, the fastener being capable of being tightened to a tightness equal to or greater than a predetermined tightness sufficient to clamp a gas line disposed between the interlock nut clamp and the pedestal portion.

2. The apparatus of claim 1, further comprising:

a momentary switch disposed within the pedestal portion, wherein the momentary switch is closed when the fastener is tightened to a tightness equal to or greater than the predetermined tightness sufficient to clamp the gas line disposed between the interlock nut clamp and the pedestal portion and open when the fastener is not tightened to a tightness equal to or greater than the predetermined tightness sufficient to clamp the gas line disposed between the fitting support portion and the pedestal portion.

3. The apparatus of claim 2 further comprising:

a first circuit including a first power source and at least one indicator, wherein the at least one indicator is operably coupled to the momentary switch and the first power source such that the at least one indicator presents an indication when the momentary switch is closed and does not present an indication when the momentary switch is not closed; and a second circuit including a second power source, wherein the second circuit is operably coupled to the momentary switch and the second power source such that the second circuit is closed when the momentary switch is closed and open when the second circuit is open and the second circuit is capable of being operably coupled to circuitry of equipment to which the gas fitting interlock apparatus is capable of being operably coupled, such that when the apparatus is operably coupled to the equipment and the second circuit is operably coupled to the equipment circuitry, the equipment is prevented from operating when the momentary switch is open.

4. The apparatus of claim 3, wherein the at least one indicator is an at least one light-emitting diode.

5. The apparatus of claim 3, wherein the momentary switch includes a first contact by which the momentary switch is operably coupled to the at least one indicator;

a second contact by which the momentary switch is operably coupled to the first circuit voltage source;

a third contact by which the momentary switch is operably coupled to the pedestal portion and the fitting support portion; and a fourth contact by which the momentary switch is operably coupled to an input/output interlock return, wherein the input/output interlock return is operably coupled to the second circuit power source.

6. An apparatus for atmosphere chemical vapor deposition, the apparatus comprising:

a gas fitting interlock apparatus including a pedestal portion;

a fitting support portion disposed on the pedestal portion;

an interlock nut clamp configured to be fastened to the fitting support portion; and a fastener for fastening the interlock nut clamp to the fitting support portion, the fastener being capable of being tightened to a tightness equal to or greater than a predetermined tightness sufficient to clamp a gas line disposed between the interlock nut clamp and the pedestal portion.

7. The apparatus of claim 6, wherein the gas fitting interlock apparatus further includes a momentary switch disposed within the pedestal portion, wherein the momentary switch is closed when the fastener is tightened to a tightness equal to or greater than the predetermined tightness sufficient to clamp the gas line disposed between the interlock nut clamp and the pedestal portion and open when the fastener is not tightened to a tightness equal to or greater than the predetermined tightness sufficient to clamp the gas line disposed between the fitting support portion and the pedestal portion.

8. The apparatus of claim 7, further comprising:

a first circuit including a first power source and at least one indicator, wherein the at least one indicator is operably coupled to the momentary switch and the first power source such that the at least one indicator presents an indication when the momentary switch is closed and does not present an indication when the momentary switch is not closed; and a second circuit including a second power source, wherein the second circuit is operably coupled to the momentary switch and the second power source such that the second circuit is closed when the momentary switch is closed and open when the second circuit is open and the second circuit is capable of being operably coupled to circuitry of equipment to which the gas fitting interlock apparatus is capable of being operably coupled, such that when the apparatus is operably coupled to the equipment and the second circuit is operably coupled to the equipment circuitry, the equipment is not capable of operating when the momentary switch is open.

9. The apparatus of claim 8, wherein the at least one indicator is an at least one light-emitting diode.

10. The apparatus of claim 8, wherein the momentary switch includes a first contact by which the momentary switch is operably coupled to the at least one indicator;

a second contact by which the momentary switch is operably coupled to the first circuit voltage source;

a third contact by which the momentary switch is operably coupled to the pedestal portion and the fitting support portion; and a fourth contact by which the momentary switch is operably coupled to an input/output interlock return, wherein the input/output interlock return is operably coupled to the second circuit power source.

11. An apparatus comprising:

means for receiving a gas line into an interlock component, the interlock component including a momentary switch;

means for tightening the interlock component to a tightness equal to or greater than a predetermined tightness sufficient to clamp the gas line, the tightness to which the interlock component is tightened enabling the momentary switch to close;

means for presenting an indication when the momentary switch is closed; and means for preventing gas from flowing through the gas line when the momentary switch is open.

* * * * *